June 12, 1951 W. J. CAMERON 2,556,645
PRESSURE INDICATING AND RECORDING APPARATUS
Filed July 27, 1946 5 Sheets-Sheet 3
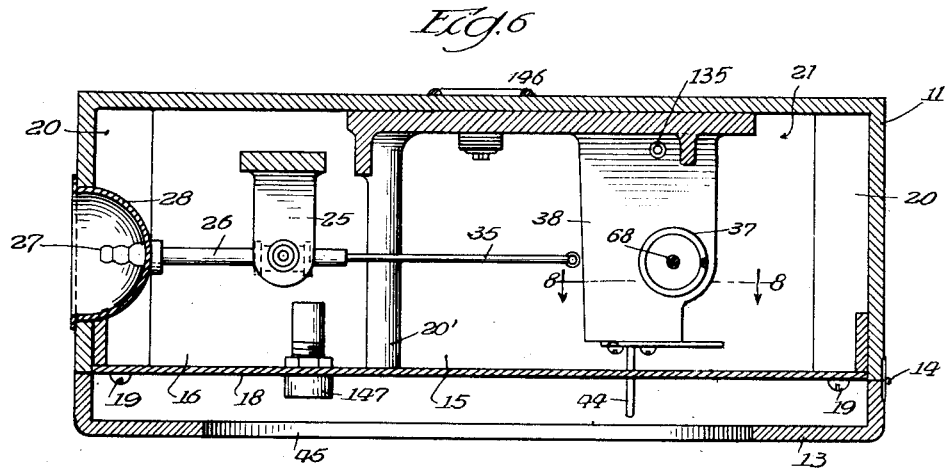
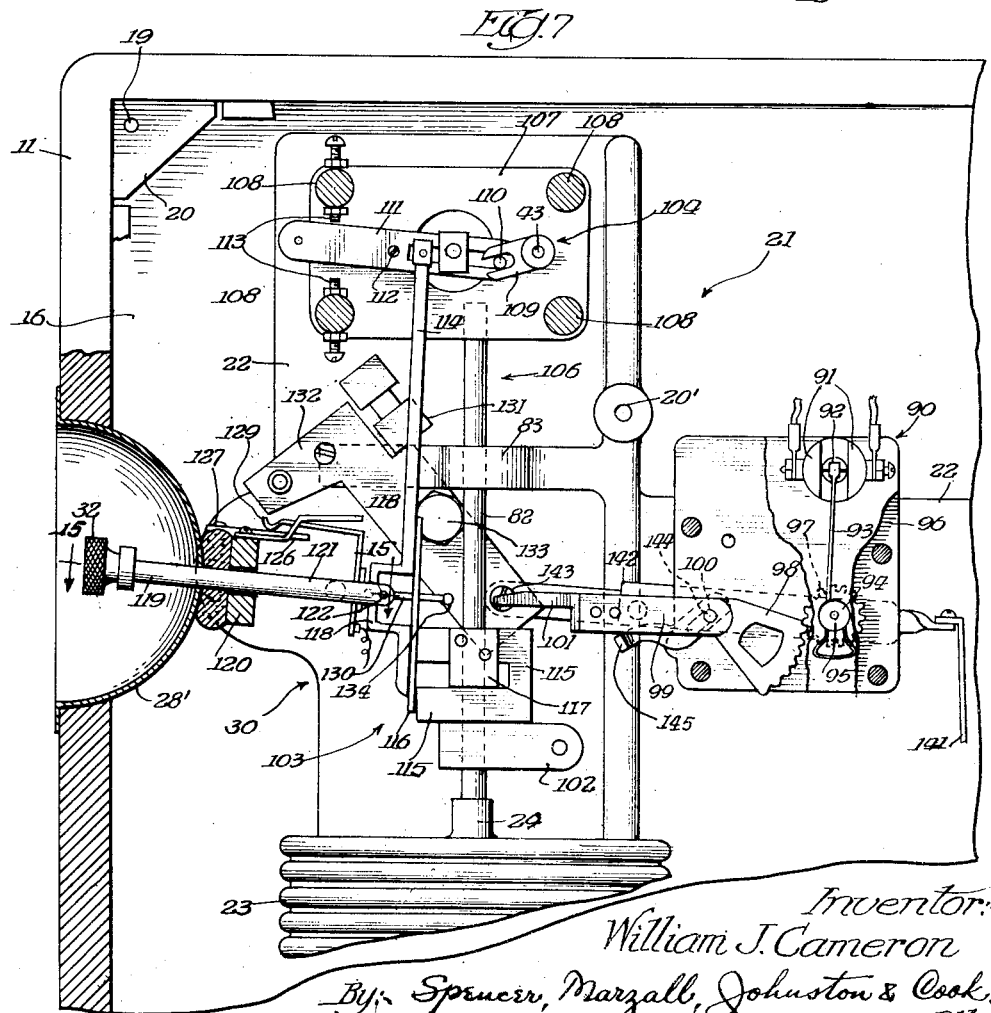
Inventor:
William J. Cameron
By: Spencer, Marzall, Johnston & Cook,
Attys June 12, 1951 W. J. CAMERON 2,556,645
PRESSURE INDICATING AND RECORDING APPARATUS
Filed July 27, 1946 5 Sheets-Sheet 4

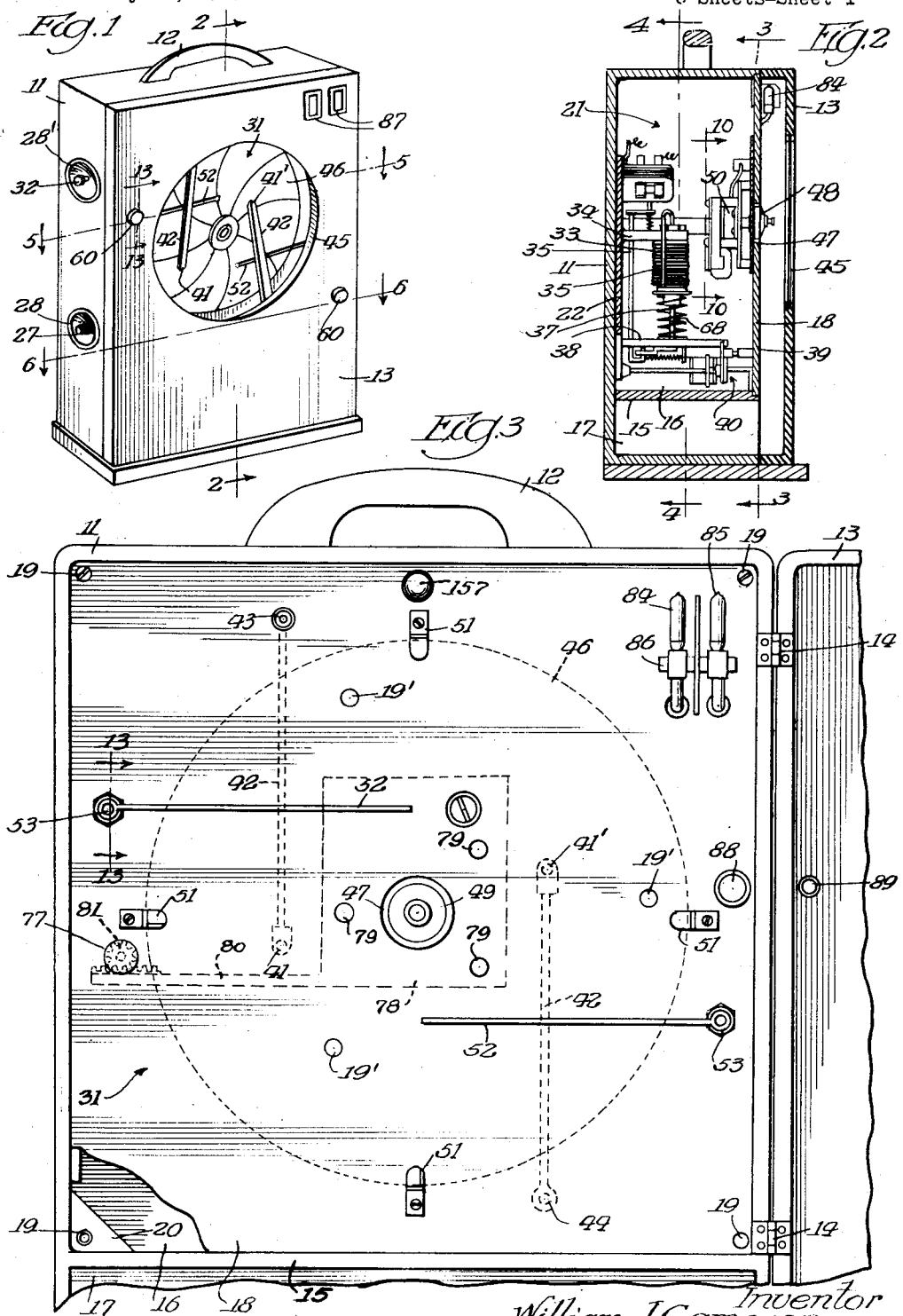

Inventor
William J. Cameron
By: Spencer, Marzall, Johnston & Cook
Attys

June 12, 1951 W. J. CAMERON 2,556,645
PRESSURE INDICATING AND RECORDING APPARATUS
Filed July 27, 1946 5 Sheets-Sheet 5

Inventor:-
William J. Cameron
By: Spencer, Marzall, Johnston & Cook
Atty.

Patented June 12, 1951

2,556,645

UNITED STATES PATENT OFFICE 2,556,645

PRESSURE INDICATING AND RECORDING APPARATUS

William J. Cameron, Chicago, Ill.

Application July 27, 1946, Serial No. 686,708

15 Claims. (Cl. 73—391)

The present invention relates in general to indicating apparatus and has more particular reference to apparatus for indicating and recording pulsating pressure variations, such as the pressure variations in the blood circulating system of a human being, the invention more especially pertaining to improved translation mechanism for converting relatively weak pulse beats to mechanical movement of appreciable displacement in order that an accurate visual indication and record may be made of the fluctuating pressures comprising the pulse beats.

Apparatus for indicating and recording relatively weak pressure pulsations of the character mentioned may comprise fluid pressure apparatus, preferably of the bellows type, for converting pressure fluctuations to mechanical movement of the bellows, operable mechanism comprising indicating or recording apparatus, or both, and suitable transmission means for coupling the bellows with the operable mechanism for the actuation of the same; and the present invention has for an important object the provision of improved clutch mechanism for selectively connecting and disconnecting the fluid pressure apparatus with the operable mechanism, whereby the fluid pressure apparatus may be disconnected from the operable mechanism to allow initial adjustment of the same to a particular patient, or in accordance with particular testing circumstances which may vary with the pressure intensity to be measured or with the frequency of pulse rate, or other variable conditions, the clutch mechanism serving to couple the fluid pressure apparatus with the indicating or recording mechanism after such initial adjustment has been accomplished.

Another important object is to provide clutch mechanism for quickly and positively connecting the pressure apparatus with the recording mechanism; a further object being to utilize magnetic clutch means for the purpose; and a still further object being to provide readily operable manual means for the control of the clutch mechanism.

Another important object is to provide a magnetic clutch comprising a relatively light weight driven magnet drivingly connected with the pressure responsive apparatus, as on a shaft, drivingly connected with an expansible bellows forming a part of the pressure apparatus, and cooperating magnet means drivingly connected with indicating mechanism, one of the magnets being selectively adjustable into position magnetically coupled with the other, and also in released position entirely free from said other magnet; a further object being to form one of said magnets as a preferably horseshoe type permanent magnet, mounted on and movable with an axially movable bellows stem, suitably supported and guided, and to form the other magnet as an armature or shoe on a swingable indicator connected arm, including manually operable finger controlled means, preferably in the form of a push-pull button for swinging the arm between retracted magnet disconnected position and projected magnet coupling position.

Another important object is to provide positively acting visual indicator means for showing the adjusted position of the pressure responsive apparatus while the same is disconnected from the recording mechanism, so that such pressure responsive mechanism may be adjusted within a desired or preferred operating range and thus be initially conditioned for connection with the recording mechanism; a further object being to provide for the automatic attachment of such visual indicating means with the pressure responsive apparatus whenever the recording mechanism is disconnected therefrom, and to disconnect the visual indicating means from the pressure responsive apparatus when the same is connected with the recorder.

Another important object is to provide improved mechanism for setting the recorder to a selected datum, or zero position; a further object being to utilize manually adjustable means connected with the pressure apparatus and with the recorder mechanism for datum setting purposes; a still further object being to provide means for adjustably shifting the record chart with respect to the pressure responsive scribers for zero setting purposes.

A still further object is to provide a chart supporting and turning motor adjustable in a direction radial of the chart turning axis thereof, to thereby zeroize the chart with respect to scriber means disposed radially of said axis.

The foregoing and numerous other important objects, advantages, and inherent functions of the invention will become apparent as the invention is more fully understood from the following description, which, taken in conjunction with the accompanying drawings, discloses a preferred embodiment of the invention.

Referring to the drawings:

Fig. 1 is a perspective view of indicating and recording apparatus embodying the present invention;

Fig. 2 is a sectional view taken substantially along the line 2—2 in Fig. 1;

Figure 4:
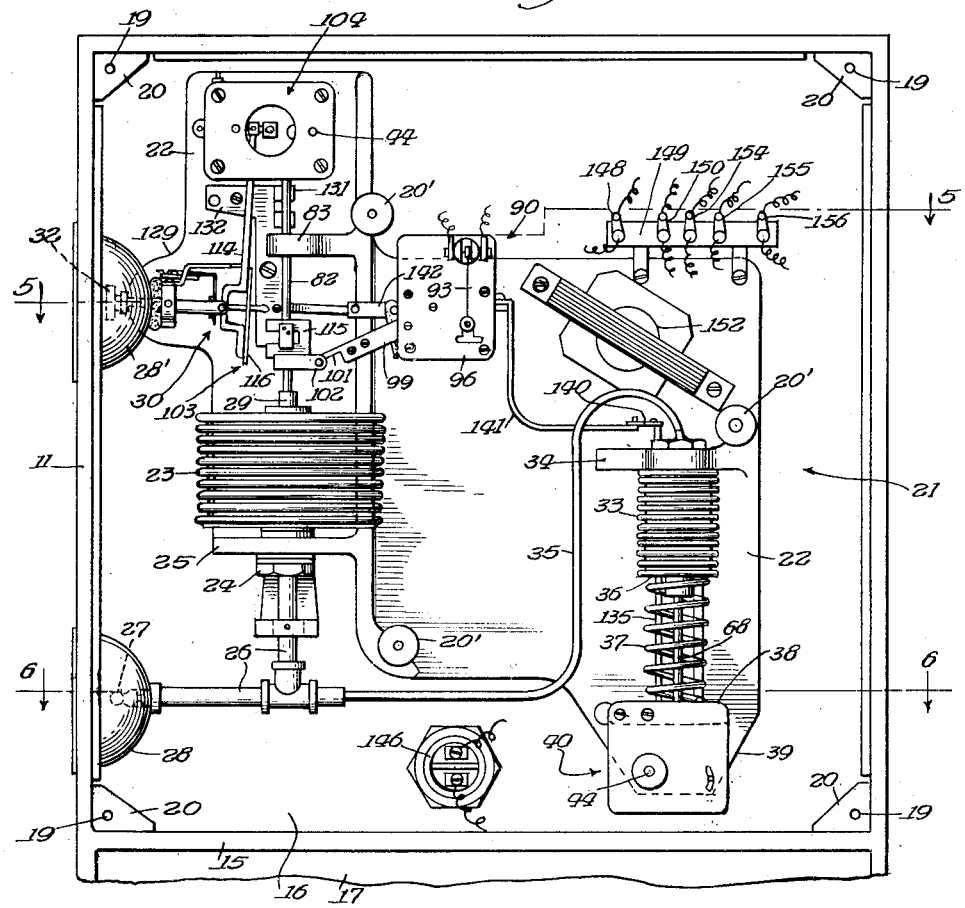
Figure 5:
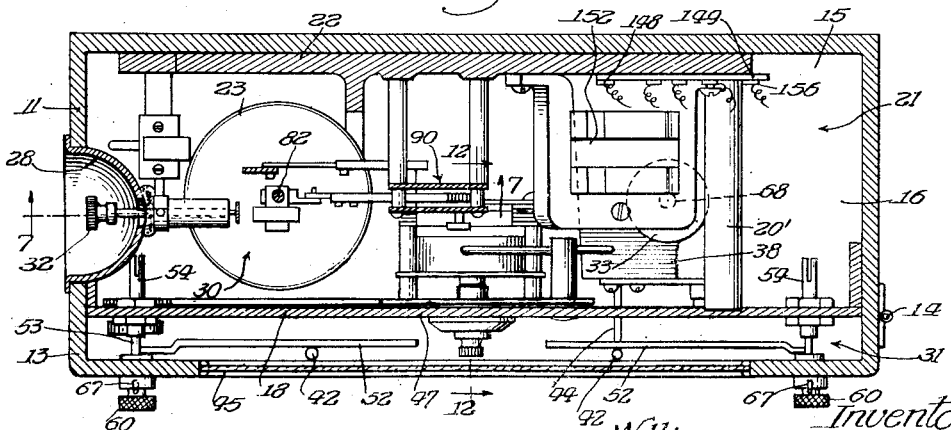
Figure 8:
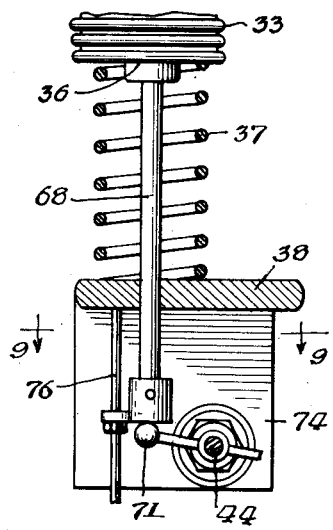
Figure 9:
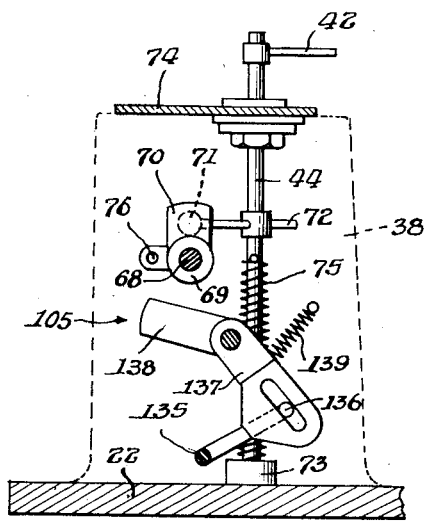
Figure 10:
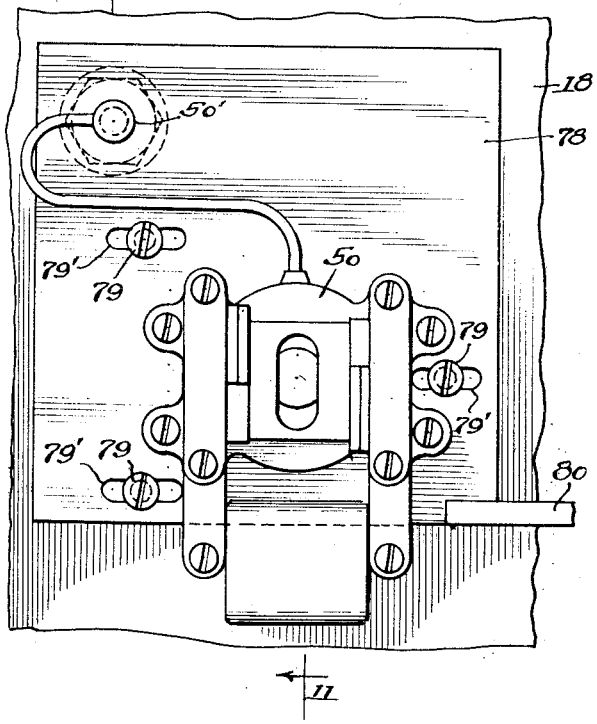
Figure 11:
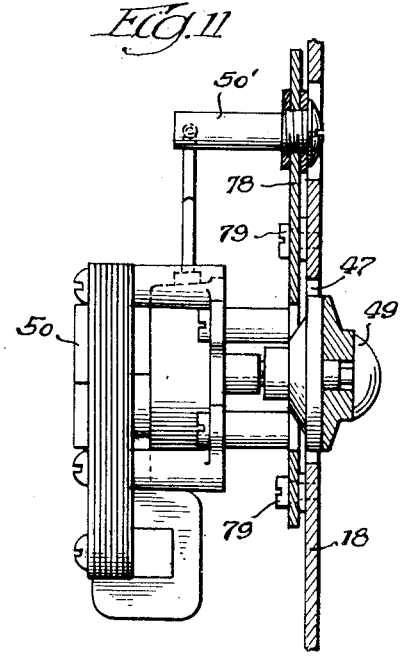
Figure 13:
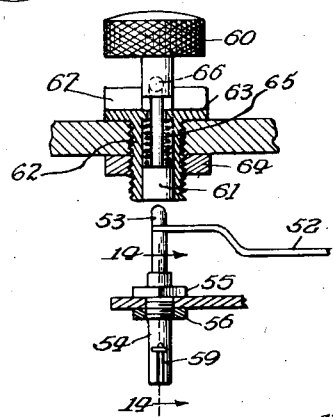
Figure 14:
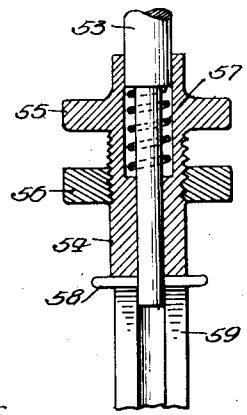
Figure 16:
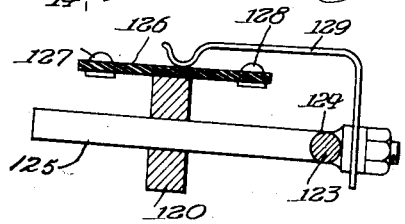
Figure 15:
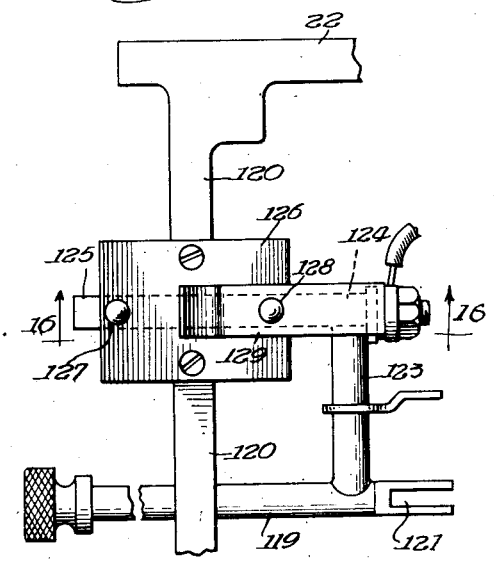
Figure 12:
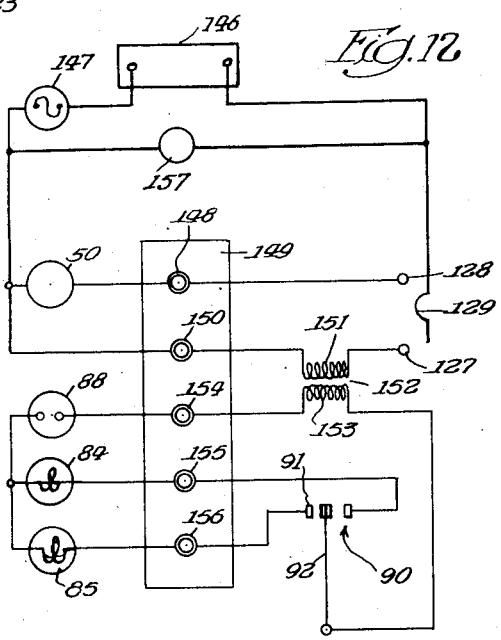

Figs. 3 and 4, respectively, are sectional views taken substantially along the lines 3—3 and 4—4 in Fig. 2;

Figs. 5 and 6, respectively, are sectional views taken substantially along the lines 5—5 and 6—6 in Fig. 1;

Fig. 7 is an enlarged sectional view taken substantially along the line 7—7 in Fig. 5;

Fig. 8 is a sectional view taken substantially along the line 8—8 in Fig. 6;

Fig. 9 is a sectional view taken substantially along the line 9—9 in Fig. 8;

Fig. 10 is a sectional view taken substantially along the line 10—10 in Fig. 2;

Fig. 11 is a view taken substantially along the line 11—11 in Fig. 10;

Fig. 12 is a diagram of electrical connections;

Fig. 13 is an enlarged sectional view taken substantially along the line 13—13 in Fig. 1;

Fig. 14 is an enlarged sectional view taken substantially along the line 14—14 in Fig. 13;

Fig. 15 is a sectional view taken substantially along the line 15—15 in Fig. 7; and Fig. 16 is a sectional view taken substantially along the line 16—16 in Fig. 15.

To illustrate the invention, the drawings show indicating and recording mechanism 21 comprising pressure responsive apparatus including a pair of expansible, preferably metallic, bellows elements 23 and 33, recording mechanism 31 including marking devices 41 and 41' swingably mounted respectively on shafts 43 and 44, driving mechanism 30 for operating the marking device 41 in response to movement of the bellows 23, driving mechanism 40 for moving the marking device 41' in response to movement of the bellows 33, card holding and moving means 49, 50 for moving a record card 46, preferably at a uniform rate of speed with respect to the marking devices 41 and 41', clutch means 103 for selectively coupling and uncoupling the driving mechanism 30 with the bellows 23, indicating means 84, 85 and 90 adapted for connection with the bellows 23 when the mechanism 30 is disconnected therefrom and to be disconnected from the bellows when the mechanism 30 is connected therewith by the clutch means 103, and manually adjustable zeroizing or datum setting mechanism for adjusting the marking device 41' to a desired adjusted position with respect to the record card.

The indicating and recording apparatus 21 may, for convenience, be mounted in a suitable container 11 provided with a carrying handle 12. The container 11 may comprise a box having a top, bottom and side walls, a back wall and an open front fitted with a door 13 hinged, as at 14, along a side edge of the door. The interior of the box may be divided as by a partition 15 to provide a preferably upper mechanism compartment 16 and an adjacent, preferably lower storage compartment 17 for tools, accessories and the like. The open front of the mechanism compartment is preferably fitted with a panel member 18, which may be supported as by screws or other suitable fastening elements 19, at the corners of the panel 18 and taking into mounting blocks 20, disposed at the corners of the mechanism compartment 16.

The indicating and recording apparatus 21 is mounted within and on the cabinet 11, said apparatus comprising elements mounted preferably on a support frame 22 within the compartment 16, and elements supported on the panel 18 and on the door 13.

The indicating and recording apparatus 21 comprises the sensitive, pressure responsive means 23 and 33, the indicating and recording apparatus 31, including the scribers 41 and 41', the movement translating means 30 and 40, to drivingly connect the pressure responsive means with the indicating and recording apparatus, and several control mechanisms associated with the movement translating means whereby the transfer of movement from the pressure responsive means to the indicating and recording devices may be accurately regulated and controlled.

Apparatus embodying the present invention is adapted to indicate and record exceedingly small, though rapidly changing, pressure fluctuations of the sort encountered in the blood circulating system of human beings; and to this end, the pressure responsive means preferably comprises sensitive pressure bellows means adapted to expand and contract precisely and substantially exactly in accordance with the pressure applied thereto. Any suitable or preferred means, of course, may be utilized for applying the pressures, to be indicated and recorded, to the sensitive bellows means.

The present invention, however, contemplates the utilization of a conventional inflation device adapted to pick up pressures to be indicated or recorded, and apply such pressures to the bellows means. Where used for recording the blood pressures in human beings, the pickup device may comprise a standard blood pressure inflation member to be applied as upon the arm of the patient whose pressure graph is to be recorded, connected with the bellows means to form a fluid pressure system adapted to be placed under preferably pneumatic pressure of desired intensity, as by operation of a simple hand pump that may comprise a bulb connected to and forming a part of the inflation device.

To this end, the bellows means may comprise a Sylphon type bellows 23 supported at one end, as by clamp nut means 24 on a rib 25 preferably forming an integral part of the frame 22, the so mounted end of the bellows 23 being connected, as by suitable conduit means 26, with a nozzle 27 exposed outwardly of a side wall of the cabinet 11 and thus adapted for hermetic connection, as with the tube of usual rubber-like material connected with and forming a part of the pressure pickup inflation device. For its protection, the nozzle 27 is preferably recessed within the cabinet, the open end thereof being disposed with a preferably hemispherical sheet metal cup 28 mounted in an opening formed in the side wall of the cabinet.

Since one end of the bellows 23 is mounted and held firmly on the support flange 25, it opposite end 29 will be free to move as the member expands and contracts under the influence of pressure variations in the pneumatic system comprising the bellows, the conduit means 26 and a pickup inflation connected with the nozzle 27. The indicating and recording apparatus 21 also includes translation mechanism 30 mounted on the frame 22 and selectively operable to connect the movable end 29 of the bellows with recording means 31, operable in response to the manual operation of a push button 32 drivingly connected with and forming a part of the translation mechanism 30, said push button being preferably conveniently exposed outwardly of the cabinet and, for protection, being preferably recessed in a semi-cylindrical sheet metal cup 28', similar to the member 28, heretofore described. The mechanism 30, when conditioned to drivingly connect the movable end of the bellows with the recording means 31, is adapted to transfer movement thereto in exact accordance with the movement of the bellows under the influence of the varying pressures to be recorded in graphical form.

It should be understood that in making a record of pressure fluctuations, it is desirable, if not essential, to provide means for simultaneously recording data from which the actual pressures being recorded, as distinguished from pressure fluctuation, may be adduced. To this end, it is desirable to provide means for indicating on the record, from moment to moment, throughout the record as it is made, the static pressure in the pneumatic system comprising the bellows 23, the conduit means 26 and the connected inflation pickup. Even if it may safely be assumed that the static pressure in the pneumatic system remains constant during the recording interval, it is at least necessary to determine, and preferably to show directly on the record itself, the static pressure in the pneumatic system at the commencement, or at some interval during the making of the record.

The present invention, to this end, provides means for recording, continuously during the making of the fluctuating pressure graph, the static pressure in the pneumatic system including the bellows 23, said static pressure recording means comprising a bellows element 33 anchored at one end, as on a flange portion 34 of the support frame 22, said anchored end of the bellows 33 being interconnected, as by means of a conduit 35 with the conduit means 26, the conduit 35 being preferably of small diameter as compared with the diameter of the conduit means 26 in order that the bellows means 33 may be responsive to static pressure in the system, fluctuating pressures being substantially all absorbed by expansion and contraction of the bellows 23. The unanchored end 36 of the bellows 33 is preferably spring loaded, as by means of the helical spring 37 bearing at one end on the end 36 of the bellows, the other end of the spring bearing upon a flange portion 38 of the mounting frame 22.

The spring loaded end of the bellows 33 is drivingly connected with the recording means 31 by translation mechanism 40.

While any suitable or preferred recording mechanism may be employed, the present invention contemplates recording mechanism comprising marking elements 41 and 41' preferably comprising inking pens mounted at the swinging ends of pen carrying arms 42, which are drivingly connected on shafts 43 and 44, respectively, for swinging movement about the axes of said shafts. One of the pens 41, thus, may move in an arcuate path in response to rocking movement of the shaft 43, while the other pen 41' may move in a similar arcuate path in response to rocking of the shaft 44, the shafts 43 and 44 being drivingly connected for rocking movement, respectively, with the bellows devices 23 and 33 through the translation mechanisms 30 and 40.

The arm carrying ends of the shafts 43 and 44 project through openings formed in the panel 18 and thus support the pens and their carrying arms for swinging movement across the face of the panel. The door 13 is preferably provided with an opening 45, which may be fitted with a transparent window pane, said opening being preferably circular and disposed in position to reveal the central portions of the panel 18 therethrough.

Means is provided for supporting a preferably circular record card 46 for rotation in place upon the central surface portions of the panel 18 that are revealed through the window, and the pens 41 and 41' are positioned to swing across the record card 46 in directions generally radially and on opposite sides of the center of rotation of the record card so that the marking devices 41 and 41' may inscribe pressure graph lines on the record card as the same is turned.

In order to turn the record card 46, the panel 18 is formed with a central opening 47 in which is mounted a card holding spindle 48 carrying a removable clamp nut 49 so that the central portions of a record card may be applied upon and clampingly secured to the spindle 48 by means of the clamp nut 49. The spindle 48 is drivingly connected with the shaft of a constant speed electrical motor 50, preferably of the induction type, which is preferably mounted upon the back of the panel 18 in position so that the spindle 48 may be mounted directly on the motor shaft and thereby supported within the opening 47. Suitable edge holding clips 51 may be provided on the front of the panel 18 for holding the edges of the record card 46 against the panel while permitting the same to be turned in place by the operation of the motor 50.

The shaft mounted ends of the scriber arms 42 are mounted for limited rocking movement about axes at right angles to the rocking axes of the shafts, spring means being provided to normally urge the arms 42 in a direction on said rocking axes to press the scriber devices 41 into contact with the record receiving surface of the card 46. Retracting means, however, is also provided for holding the arms and scribers in retracted position against the urge of such biasing spring means, said retracting means being operable to release the scribers for marking purposes whenever it is desired to make a pressure graph record, the scribers being held in inactive position as while adjusting the mechanism for the purpose of record making.

To this end, the pen retracting means preferably comprises a retracting bar 52, one for each pen, each bar underlying the medial portion of its corresponding pen in position to support it out of marking engagement with the record card. Each bar 52, at one end, is mounted upon a stem 53 which is axially movable in a guide sleeve 54. The guide sleeve 54 is provided with clamping means, such as the flange 55 and the nut 56, whereby the sleeve and the pin 53 carried thereby may be mounted in and through a suitable opening formed in the panel 18. Spring means 57 is provided for normally urging the stem 53 in the sleeve in a direction to support the bar 52 in position restraining the marking devices 41 from contact with the card 46, movement of the stem 53 in pin 58 mounted in the stem 53 and having opposite ends riding in slots 59 formed diametrally in the sleeve 54. The lifting bars 52 thus normally hold the marking devices 41 in inoperative position, particularly when the door 13 is open and during adjustment of the mechanism prior to the making of a pressure graph record. The door, however, may be provided with means for depressing the stems 53 when the door is in closed position.

To this end, the door may be provided with manually operable knobs 60 in position to register with the stems 53 when the door is in closed position. These knobs 60 carry stems 61 which extend through sleeves 62, said sleeves being provided with clamping means, such as the heads 63 and nuts 64 for clamping the same in operative position in the openings formed in the door 13. Spring means 65 is provided within the sleeve for normally urging the stems 61 in a direction to press upon the end of the stem 53 when the stem 61 is released, the spring 65 being of sufficient strength to depress the stem 53 against the influence of the springs 57 when the knob 60 is operated to release the spring 65, providing, of course, that the door 13 is in closed position.

In order to latch the stem 61 in retracted position against the influence of the spring 65, the stem at its end adjacent the knob 60 is provided with a radial or diametral pin 66 while the head 63 is provided with a diametral slot 67. When the pin 66 is aligned with the slot 67, the spring 65 will be released to advance the stem 61 for the purpose of depressing the stem 53 against the influence of its spring 57. By retracting the knob 60, however, and turning it to misalign the pin 66 and slot 67, the pin 66 may be made to rest upon the outer surface of the head 63, thereby retaining the spring 65 in compressed position with the stem 61 in retracted position, thus releasing the stem 53 and the pen lifting bar 52 for normal pen lifting operation.

It will be seen that the pen driven by shaft 43, being drivingly connected with the bellows 23 by the mechanism 30, is adapted to mark a record card 46 in accordance with fluctuating pressures applied to the bellows by the pneumatic system including a pickup device connected with the nozzle 27. Likewise, it will be seen that the scriber connected on the shaft 44, being drivingly connected with the bellows 33 by means of the mechanism 40, will mark the record card in accordance with the substantially constant static pressure in the pneumatic system. The record card 46 may be and preferably is printed with concentric circles representing increasing pressure, in convenient units from the central portions of the card toward its peripheral margin. If desired, the pressures represented by the circles may be indicated by suitable indicia printed on the card.

The card also may conveniently be printed with radially extending curved lines, the curvature of which conforms with the curved scribing path of the scribing elements 41 in traveling over the card. These curved radial lines may represent elapsed time during the making of a record and consequently may be spaced on the record card in accordance with the normal speed of the constant speed motor 50 to represent any convenient elapsed time interval, such as seconds or fractions or multiples of seconds.

In conditioning the apparatus for the making of a pressure record, the pickup device, after conventional adjustment and attachment upon the nozzle 27, may be inflated to an exact known or measurable operating pressure in the pneumatic system, thereby extending the bellows 33 against the influence of the spring 37 and through the mechanism 40 projecting the scriber arm on shaft 44 to a position representing such static pressure.

The mechanism 40, as shown more particularly in Figs. 8, 9 and 10 of the drawings, comprises a rod or stem 68 fastened to and extending axially of the movable end 36 of the bellows 33. This stem 68 extends through and is guided in an opening formed through the lug 38 centrally of the spring 37. The end of the stem 68 is provided with a collar 69 secured thereto, as by means of a set screw, said collar having an outstanding portion 70 adapted to bear upon the preferably ball-like end 71 of a stem 72 which is anchored on and extends radially of the shaft 44. The shaft 44 is turnably supported at one end in a bearing 73 formed on the frame 22 and extends at its other or scriber carrying end in a plate 74, which in turn is supported on the lug 38.

Spring means 75 encircling the shaft 44 and fastened at one end to said shaft and at the other to the mounting frame 22 serves normally to urge the shaft 44 in a direction to hold the member 71 against the projection 70. As a consequence, any movement of the shaft 68 in an axial direction will be transmitted to the shaft 44 and hence to the scriber device connected thereon.

As a matter of convenience and to limit the movement of the stem 68 in a retracting direction under the influence of the spring 37, an adjustable set screw 76 may be provided having an end adapted to extend adjacent the lug 38 and to engage the same to form cooperating stops limiting the movement of the stem 68 in retracting position.

In order to adjust the scriber and hence calibrate the apparatus, the position of the card 46 may be adjusted by means of the knob 77 in order to mechanically position the scriber opposite the concentric line on the record card corresponding with the selected pressure under which the pneumatic system has been placed for recording purposes. To this end, the card driving motor 50, as shown more particularly in Figs. 10 and 11, may be mounted for sliding adjustment on the panel 18, whereby to adjustably move the axis of the card supporting clamp 49 between the scriber elements 41 and 41'. As shown, the motor 50 may be rigidly supported on a plate member 78, which, in turn, is slidingly supported on studs 79, which are fastened on the panel 18 outwardly of the opening 47, the studs 79 extending in elongated slots 79' formed in the plate 78. A rack bar 80 may be connected with the plate 78, and may extend to, and have driving engagement with, a pinion 81, which, in turn, is drivingly connected with the knob 77. By turning the knob 77, the plate 78 and the motor may be shifted to move the center of the record disk 46 between the scribers 41 and 41' in order, thus, to adjust the scriber which is carried on the shaft 44 with respect to a datum circle or line on the card 46. The member 50' is a lubricating device adapted to deliver lubricant to the motor 50 in response to the turning of a screw, forming a part of the lubricating device 50', the device being preferably mounted on the plate 78 in position with the screw exposed for manipulation through an opening in the panel 18.

After the apparatus has been adjusted and calibrated to a desired operating pressure in the pneumatic system by manipulation of the knob 77, the translation mechanism 30 may be operated by means of the control button 32 to connect the movable end of the bellows 23 with the scriber device mounted on the shaft 43. It should be understood that, in order to accurately perform the static pressure calibration by manipulation of the knob 77, the bellows 23 should be entirely disconnected from the recording mechanism so that it will have minimum effect upon the static pressure calibration. Accordingly, the translation mechanism 30 is adapted, when in non-recording position, to release the bellows 23 entirely for unhampered movement. The movable end of the bellows 23, however, is provided with an axially extending stem 82 fastened to the end of the bellows and movable therewith, said stem being loosely guided in an opening formed in a lug 83, which may conveniently be formed as an integral portion of the mounting frame 22.

The bellows 23 is exceedingly flexible and precisely responsive to any pressure fluctuations which may occur in the pneumatic system through the operation of the pickup inflation. In measuring minute pressure changes of the sort comprising human pulse beats, the movement imparted to the bellows 23 will be of the order of a fraction of an inch of expansion and contraction of the bellows. Such movement, however, for the production of a successful, accurate pressure graph should occur through an indicating range that is not less than a preselected minimum operating displacement of the movable end of the bellows, and in order to provide readily observable means for indicating whether or not the adjusted apparatus is adjusted for operation within such suitable range, the present invention contemplates the provision of indicating means adapted for operation during the calibration of the apparatus and before the making of a record is commenced, that is to say, before the bellows 23 is drivingly connected through the mechanism 30 with the scriber connected on the shaft 43.

To this end, the apparatus includes a pair of lamps 84 and 85 preferably adapted to emit light of distinguishable color. These lamps are mounted in suitable support means 86 preferably on the panel 18, as at a corner portion thereof, in position immediately behind window openings 87 in the door 13 in position to reveal said lamps therethrough. The lamps may be connected in circuit through push button control switch means 88 preferably mounted in the panel and adapted to place the lamps in operation when pressed down. The door 13, also, preferably has a switch operating finger 89 in position to register with the push button 88 when the door is closed, whereby the lamps may be energized at will by pressing on the button 88 when the door is open and will continue to function after the door is closed.

In addition to the push button 88, which preferably controls both lamps, each lamp is connected with alternating switch means 90, the same comprising a pair of stationary contacts 91, each connected with an appropriate lamp, and a movable contact 92 mounted on a stem 93 in position to move between and alternately engage the contacts 91 to thereby alternately connect the lamps 84 and 85 in a lamp energizing circuit.

The stem 93 may conveniently comprise a length of wire carrying the contact 92 at one end and wrapped at the other end upon, and thus frictionally engaged with, a pulley 94, said pulley being fast on a shaft 95 journaled in a support frame 96, which in turn may be conveniently mounted on suitable pedestals forming a part of the mounting frame 22. The shaft 95 carries a spur gear 97 in position to drivingly engage a gear segment 98 formed at one end of a lever 99 which is pivoted as at 100 on the frame 96, and which has a remote end 101 extending into position to engage a lug 102 on the stem 82. The shaft 95 has spring means associated therewith and attached at one end on the shaft and at the other on the frame 96 to normally urge the shaft and gear in a direction to press the lever end 101 into operative engagement with the lug 102.

When the bellows 23 is in motion in response to varying pressures in the pneumatic system connected therewith, such motion will rock the lever 99 and rotate the shaft 95 and the pulley 94. The frictional engagement of the contact support wire 93 with said pulley will cause the wire and the contact 92 to vibrate between the stationary contacts 91. As a consequence, the switch means 90 will alternately cause the lamps 84 and 85 to function, one lamp being energized by expansion of the bellows and the other by contraction thereof following expansion. If, however, the expanding and contracting movement of the bellows represents less than a minimum displacement required for adequate graphing, either one lamp or both will fail to operate. As a consequence, the lamps afford readily perceivable means indicating desirable adjustment of the apparatus for graphing purposes only when both lamps in succession, and repeatedly, become energized. The lost motion through the friction connection of the contact support member 93 on the pulley element 94 renders the switch mechanism self-adjusting to it in the expanded position of the bellows 23 at which it may be required to operate. The frictional connection further allows the lever 99 to be swung to inoperative position, as hereinafter more fully described, while the graph is being made to thereby relieve the bellows from the load of the switch 90 and its operating lever 99.

After conditioning the apparatus for pressure recordation, as heretofore described, the mechanism 30 may be operated to drivingly connect the shaft 82 of the bellows 23 with the scriber pen on the shaft 43. In this connection, it should be noted that the connecting mechanism 30 desirably should provide for the immediate positive connection and also for the immediate release of the bellows. Mechanism also desirably should provide for releasing the driving connection through the lever 99 with the switch in order that all movement of the bellows 23 may be applied to drive the scriber device on the shaft 43. Desirably also, the mechanism 30 should provide for applying a yielding brake on the bellows 33 while the bellows 23 is connected with the scriber device on the shaft 43, whereby to eliminate even minute recording inaccuracies through slight movement imparted in the bellows 33 by fluctuating pressure in the pneumatic system. The means for braking the bellows 33 during recordation, however, will not impair the ability of the bellows, through the mechanism 40, to operate the scriber device on the shaft 44 in marking the static pressure of the pneumatic system on the record card during the pressure graphing period.

The driving mechanism 30 comprises magnetic clutch means 103 operable under the control of the push button 32 selectively to clutch the shaft 82 positively with shaft driving means 104 which is drivingly connected with the shaft 43. The push button 32, as hereinafter more fully described, also serves to actuate brake mechanism 105 cooperatively associated with the shaft 68 of the bellows 33 in order to dampen the action of the bellows 33 when the clutch 103 is in position to drivingly connect the bellows 33 with the scriber on the shaft 43. The push button 32 may also be connected to release the driving connection between the shaft 82 and the lever 99 whereby to disconnect the switch 90 from the bellows 23 when the latter is drivingly connected with its scriber device on the shaft 43.

In the interests of recording accuracy it is desirable, to apply a drag on the shaft 82 while the shaft is disconnected from the scriber device, such drag being approximately equal to the load or drag supplied by the scriber device when the shaft 82 is drivingly connected therewith; and the push button 32 may be and preferably is drivingly connected to operate drag means 106, said means serving when the clutch 103 is open, to apply a drag on the shaft 82 and to relieve the shaft from said drag when the clutch means 103 is engaged.

To these ends, the shaft driving mechanism 104 preferably comprises a sub-assembly on a frame 107 preferably mounted on suitable pedestals 108 on the frame 22, the frame 107 providing journal means for rockingly supporting the scriber carrying shaft 43. The fork fitting 109 on the shaft 43 provides for drivingly engaging the shaft with a pin 110 formed at the end of a lever 111 pivoted, as at 112, in the frame 107, said lever having an end remote from the pin 110 in position to swing between adjustable stops 113, which may conveniently comprise set screw mounted in a pair of spaced pedestals 108, or extensions thereof. Pivotally connected with the lever 111, preferably intermediate the pin 110 and the pivot 112, is a connecting rod 114 extending alongside of the rod 82, the clutch means 103 being cooperatively associated and adapted to drivingly interconnect and release the connecting rod 114 and the shaft 82.

As shown in the drawings, the clutch means 103 may comprise a permanent magnet element 115 and a cooperating armature element 116, one of said elements being secured on the connecting rod 114 and the other on the stem 82, the rod connected element being also connected with the push button 32 so that the magnet and its armature may either be separated or moved into magnetic interengagement by manipulation of the push button 32. The magnet 115 is preferably of horseshoe type and is preferably secured to the stem 82 in any suitable or preferred fashion, as by means of a clamp 117, the armature comprising a strip of magnetic material secured to the arm 114 which is preferably of non-magnetic material, at a point in said arm remote from its pivotal connection with the lever 111. The arm 114 preferably forms a bracket 118 for pivotal connection with the end of an actuating stem 119, said stem being slidingly supported in bracket means 120, on the frame 22. The end of the stem 119 remote from its bracket connected end may carry the push button 32 in position exposed outwardly of the cabinet, within the housing shell 28'. The bracket connected end of the stem 119, as shown more particularly in Fig. 15, is split as at 121 to form a fork for slidingly receiving the bracket therebetween. The forked end of the stem 119 carries a pin 122 within the bracket 118 to pull the bracket and the arm in a clutch releasing direction and to release the bracket from the arm when the stem is pushed to engage the clutch.

When the push button and connected arm 114 are in retracted, clutch disconnected position as shown in Fig. 4, the bellows and stem 82 will be entirely disconnected from the scriber device mounted on the shaft 43. When, however, the push button is moved to clutching position with the armature 116 in physical engagement with the pole faces of the magnet 115, as shown in Fig. 7 of the drawings, the shaft 82 will be directly and positively connected through the rod 114 to rock the driving mechanism 104, including the shaft 73, in exact accordance with the movements of the bellows 23, the bracket connecting pin 122 on the stem 119 advancing into the bracket 118 and thus being entirely disconnected from the arm 114, when the clutch is in engaged position, whereby the movement of the translating mechanism is not in any way modified by connection with the stem 119.

As shown more particularly in Figs. 4, 5, 7 and 15, the stem 119 comprises part of a frame including a member 123 secured to the stem adjacent its split end 121, the member 123 being bent, as at 124 to provide an end 125 spaced from and parallel with the stem 119. The frame portion 125 may be slidingly received and supported in an opening in the bracket means 120.

The bracket means 120 may also carry an insulated member 126 on which a pair of switch contacts 127 and 128 are mounted in position to be alternately engaged by a movable switch blade 129 mounted on and movable with the frame member 123 whereby to control the operation of the indicator lamps 84 and 85 and the motor 50, in a manner hereinafter to be more fully described.

The frame 123 also carries a connecting rod 130 for controlling the operation of the lamp actuating switch means 90, the brake mechanism 105 for the bellows 33, and the drag mechanism 106 associated with the stem 82. The drag mechanism 106 preferably comprises a permanent magnet 131, preferably of the horseshoe type, which is mounted on a rockable support frame 132 pivoted for rocking movement on a suitable pin 133, which may conveniently be mounted on the support frame 22. The frame 132 is pivotally connected, as at 134, to the connecting rod 130 so that, when the push button 32 and connected frame member 123 are in position releasing the clutch 103, the drag magnet 131 will be supported in position on the member 132, with the pole faces of the drag magnet adjacent and in dragging relationship with the stem 82 which preferably comprises magnetic material. When, however, the push button and its connected frame 123 are in position engaging the clutch means 103, the connecting rod 130 will tilt the magnet carrying member 132 into position withdrawing the drag magnet 131 from stem influencing position, thereby releasing the stem from the drag of the magnet. The parts should be so adjusted that the drag applied by the magnet 131 on the stem 82 is approximately equal to the mechanical load applied on the stem when it is drivingly connected with the scriber shaft 43 to thereby equalize the load on the bellows 23 during the graphing and calibrating periods.

Means is also provided for actuating the brake mechanism on the bellows 33 and for disconnecting the indicator light actuating switch 90 when the push button 32 and its connected frame 123 are in position engaging the clutch means 103. To this end, the brake mechanism 105 may comprise a stem 135 pivotally supported for turning movement in the flanges 34 and 38 adjacent the bellows 33 and its counterbalance spring 37, the stem 135 having a crank arm 136 at one end and drivingly connected with a pivoted brake element 137 tiltably mounted on the flange 38 and having a brake shoe portion 138 in position to brakingly engage and to release the stem 68 depending upon the rocked position of the stem 135.

If desired, toggle spring means 139 may be provided, anchored at one end on a pin in the flange 38 and at the other on the brake actuating mechanism to hold the brake yieldingly in either its engaged or disengaged position. The stem 135, at its end remote from the crank arm 136, is provided with an actuating crank arm 140 pivotally connected, as by means of a connecting strip 141 with an actuating bar 142, which in turn is pivoted, as at 143, on the member 132 adjacent the connection therewith of the connecting rod 130. As a consequence, the brake shoe element 138 may be caused to brakingly engage the bellows stem 68 when the push button 32 is depressed to engage the clutch means 103, the brake member 138 releasing the stem 68 whenever the push button 32 is retracted to release the clutch means 103.

The actuating bar 142 also may be pivotally connected, as at 144, with an arm of a bell crank lever, pivoted on the switch frame 96, the other arm 145 of which lever extends in position to cooperatively engage with the switch actuating lever 99, the parts being so arranged that when the actuating bar 142 is in position corresponding with clutch releasing position of the control knob 32, the bell crank arm 145 will be in position allowing the lever 99 to drivingly engage the projection 102 on the stem 82, thereby allowing the lamp actuating switch 90 to operate. When, however, the push button 32 is depressed to engage the clutch means 103, the corresponding movement imparted to the actuating bar 142 will serve to move the bell crank arm 145 in a clockwise direction, viewing Fig. 7, whereby to move the switch actuating lever 99 to inoperative position entirely released from the lever actuating projection 102 on the stem 82.

It will be seen from the foregoing that the apparatus herein disclosed affords facilities for calibrating the apparatus for fluctuating pressure graphing purposes wherein the fluctuating pressures to be recorded graphically comprise relatively small pressure variations, which may fluctuate at a rapid rate. The apparatus affords means for calibrating the same accurately with regard to the mean or average pressure within the fluctuating range being graphed and to perform such calibration while the recording apparatus is inactive, the invention further providing means operable to place the recording equipment in operation without disturbing the calibrated condition of the equipment and, in this connection providing means for compensating the apparatus, during the record making interval in order to eliminate recording errors due to switching the equipment from calibrating to recording position.

A suitable electrical system, shown diagrammatically in Fig. 12, may be provided for actuating the motor 50 and the lamps 84 and 85. In this connection, it may be noted that the system embodies means for actuating the motor 50 only during the recording interval and for operating the lamps 84 and 85 while the apparatus is being calibrated for the making of a record.

To this end, the electrical system may include a suitable power plug in a socket 146 preferably mounted in position exposed on a wall, such as the back wall on the casing 11, to facilitate connection of the apparatus with a suitable electrical power source, such as the plug in the socket of a house wiring system, or other electrical distributing network. One side of the socket 146 may be electrically connected through suitable fuse means 147, which may conveniently be located on the panel 18, as in a corner thereof, the circuit extending from the fuse 147 as parallel arms or branches, one of which extends to and through the motor 50 to a terminal 148 on a suitable insulated terminal block 149, which may conveniently be supported on the base frame 22. The other arm of the circuit may be connected directly from the fuse 147 to a terminal 150 on the block 149.

The terminal element 148 is connected with the switch contact 128 while the terminal element 150 is connected through the primary winding 151 of a preferably step-down transformer 152, the circuit extending thence to the other switch contact 127. It will be noted that when the push button 32 is in position engaging the clutch means 30 during the record making interval, the switch blade 129 will be in position engaging the switch contact 128, thus energizing the motor 50 for operation to turn the record card 46. When, however, the push button 32 is retracted to release the clutch means 103 thereby displacing the record pen on the shaft 43, the switch blade 129 will have disengaged the contact 128 thereby disabling the motor 50, and will have engaged the switch contact 127 thereby energizing the primary winding of the transformer 152.

The transformer 152 may be suitably mounted within the cabinet 11, as on the support member 22, and it has a secondary winding 153 adapted, when the transformer is energized, to supply electrical energy at predetermined voltage for the actuation of the lamps 84 and 85, under the control of the push button switch 88 and the alternating switch 90. To this end, one side of the secondary winding 153 of the transformer is electrically connected to the movable contact element 92 of the switch 90, as by grounding the transformer winding on the frame 96 of the switch unit. The other side of the secondary winding 153 may be connected, as through a terminal element 154 on the block 149 to one side of the push button switch 88. The other side of said push button switch may, as shown, be connected in common to one side of each of the lamps 84 and 85, the other side of said lamps being individually connected each preferably through a terminal element 155 and 156, each with a corresponding one of the stationary switch terminals 91. A pilot lamp 157, exposed to view on the front of the panel 18, may be provided to indicate at all times whether electrical power is applied to the socket 146 or not.

It will be seen from the foregoing that the present apparatus embodies a sensitive pneumatic system having a portion highly responsive to pressure fluctuations and a less responsive portion for static pressure determination, including means whereby the sensitive portion may be substantially freed from all load for the purpose of enabling the system to be accurately calibrated with respect to static pressure conditions. The apparatus also includes means operable to connect the highly responsive portion of the pneumatic system with a recording device and simultaneously to yieldingly brake the less responsive portions so that they will not affect the operation of the highly responsive portion during the pressure graphing period, such braking, however, serving to allow said less responsive portion accurately to indicate any change in static pressure conditions during the recording interval.

The apparatus also includes the additional refinements residing in the provision of drag means operable upon the highly responsive portions of the pneumatic system only while disconnected from the graphing mechanism so that such highly responsive portions will respond during the recording period in the same manner as when disconnected from the graphing mechanism.

The apparatus further includes the facility for indicating in readily perceivable fashion, as by alternating flashing indicator lines, that the sensitive portions of the mechanism are in operation within a satisfactory recording range of movement thereof; a further valuable refinement comprising the simple, readily adjustable arrangement for zeroizing or setting the static pressure recording mechanism to a desired calibrated position.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In a measuring apparatus, the combination, with means forming a fluid pressure system having a sensitive portion movable substantially in accordance with pressure fluctuations in the system, a relatively less sensitive gauge portion adapted to react substantially to static pressure conditions in said system, whereby to show or gauge prevailing static pressure conditions in said system, and operable means adapted for actuation in response to movements of said sensitive portion, of clutch means selectively operable to drivingly connect said sensitive portion with said operable means and to disconnect the same therefrom, and brake means operable in unison with said clutch means to yieldingly brake said gauge portion against reaction to pressure fluctuations in said system while the sensitive portion is drivingly connected with the operable means.

2. In a measuring apparatus, the combination, with means forming a fluid pressure system having a sensitive portion movable substantially in accordance with pressure fluctuations in the system, a relatively less sensitive gauge portion adapted to react substantially to static pressure conditions in said system, whereby to show or gauge prevailing static pressure conditions in said system, and operable means adapted for actuation in response to movements of said sensitive portion, of clutch means selectively operable to drivingly connect said sensitive portion with said operable means and to disconnect the same therefrom, and brake means operable in unison with said clutch means to yieldingly brake said gauge portion against reaction to pressure fluctuations in said system while the sensitive portion is drivingly connected with the operable means, drag means for applying a phantom load on said sensitive portion while disconnected from said operable means, and means to remove said load from said sensitive portion when the same is connected to said operable means.

3. In a measuring apparatus, the combination, with means forming a fluid pressure system having a sensitive portion movable substantially in accordance with pressure fluctuations in the system, a relatively less sensitive gauge portion adapted to react substantially to static pressure conditions in said system, whereby to show or gauge prevailing static pressure conditions in said system, and operable means adapted for actuation in response to movements of said sensitive portion, of clutch means selectively operable to drivingly connect said sensitive portion with said operable means and to disconnect the same therefrom, and brake means operable in unison with said clutch means to yieldingly brake said gauge portion against reaction to pressure fluctuations in said system while the sensitive portion is drivingly connected with the operable means, alternatingly operable indicating means for showing the operating range of movement of the sensitive portion of said pressure system, driving means for controllingly connecting said indicating means with said sensitive portion, and means for disconnecting said driving means when said sensitive portion is drivingly connected with said operable means.

4. In a measuring apparatus, the combination, with means forming a fluid pressure system having a sensitive portion movable substantially in accordance with pressure fluctuations in the system, a relatively less sensitive gauge portion adapted to react substantially to static pressure conditions in said system, whereby to show or gauge prevailing static pressure conditions in said system, and operable means adapted for actuation in response to movements of said sensitive portion, of clutch means selectively operable to drivingly connect said sensitive portion with said operable means and to disconnect the same therefrom, and brake means operable in unison with said clutch means to yieldingly brake said gauge portion against reaction to pressure fluctuations in said system while the sensitive portion is drivingly connected with the operable means, drag means for applying a phantom load on said sensitive portion while disconnected from said operable means, and means to remove said load from said sensitive portion when the same is connected to said operable means, alternatingly operable indicating means for showing the operating range of movement of the sensitive portion of said pressure system, driving means for controllingly connecting said indicating means with said sensitive portion, and means for disconnecting said driving means when said sensitive portion is drivingly connected with said operable means.

5. In a measuring apparatus, the combination, with means forming a fluid pressure system having a sensitive portion movable substantially in accordance with pressure fluctuations in the system, a relatively less sensitive gauge portion adapted to react substantially to static pressure conditions in said system, whereby to show or gauge prevailing static pressure conditions in said system, and operable means adapted for actuation in response to movements of said sensitive portion, of clutch means selectively operable to drivingly connect said sensitive portion with said operable means and to disconnect the same therefrom, and brake means operable in unison with said clutch means to yieldingly brake said gauge portion against reaction to pressure fluctuations in said system while the sensitive portion is drivingly connected with the operable means, drag means for applying a phantom load on said sensitive portion while disconnected from said operable means, and means to remove said load from said sensitive portion when the same is connected to said operable means, said drag means comprising magnetic means connected for movement with said sensitive portion and a permanent magnet adapted to be disposed in position to exert a drag on said magnetic means when said sensitive portion is disconnected from said operable means.

6. In a measuring apparatus, the combination, with means forming a fluid pressure system having a sensitive bellows movable substantially in accordance with pressure fluctuations in the system, gauge means adapted to react substantially to static pressure conditions in said system, whereby to show or gauge prevailing static pressure conditions in said system, and recording apparatus adapted for actuation in response to movements of said sensitive bellows, of clutch means selectively operable to drivingly connect said sensitive bellows with said recording apparatus and to disconnect the same therefrom, and brake means operable in unison with said clutch means to yieldingly brake said gauged means against reaction to pressure fluctuations in said system while the sensitive bellows is drivingly connected with the recording apparatus.

7. Measuring apparatus as set forth in claim 6, wherein said clutch means comprises cooperating magnets connected respectively with said bellows and with said recording apparatus.

8. Measuring apparatus as set forth in claim 6, wherein said clutch means comprises cooperating magnets connected respectively with said bellows and with said recording apparatus, a shiftable drag magnet for applying a phantom load on the sensitive bellows when said bellows is disconnected from said recording apparatus, and means operable with said clutch means to project and retract said drag magnet respectively to operative and inoperative position, whereby to apply said phantom load to said bellows and to relieve the bellows of said load, as said clutch is respectively positioned in releasing or driving relation with the recording apparatus.

9. In a measuring apparatus, the combination, with means forming a fluid pressure system having a sensitive bellows movable substantially in accordance with pressure fluctuations in the system, and recording apparatus adapted for actuation in response to movements of said sensitive bellows, of clutch means selectively operable to drivingly connect said sensitive bellows with said recording apparatus and to disconnect the same therefrom, a shiftable drag magnet for applying a phantom load on the sensitive bellows when said bellows is disconnected from said recording apparatus, and means operable with said clutch means to move said magnet to load applying position and to retract said magnet to inoperative position respectively as said clutch is in disconnecting position or in position drivingly connecting the bellows with the recording apparatus.

10. In a measuring apparatus, the combination, with means forming a fluid pressure system having a sensitive bellows movable substantially in accordance with pressure fluctuations in the system, gauge means adapted to react substantially to static pressure conditions in said system, whereby to show or gauge prevailing static pressure conditions in said system, and recording apparatus adapted for actuation in response to movements of said sensitive bellows, of clutch means selectively operable to drivingly connect said sensitive bellows with said recording apparatus and to disconnect the same therefrom, and brake means operable in unison with said clutch means to yieldingly brake said gauge means against reaction to pressure fluctuations in said system while the sensitive bellows is drivingly connected with the recording apparatus, drag means for applying a phantom load on said sensitive bellows while disconnected from said recording apparatus, and means to remove said load from said sensitive bellows when the same is connected to said recording apparatus, said phantom load being substantially equal to the actual load applied on the sensitive bellows by said recording apparatus when connected therewith.

11. In a measuring apparatus, the combination, with means forming a fluid pressure system having a sensitive portion movable substantially in accordance with pressure fluctuations in the system, a gauge portion adapted to react substantially to static pressure conditions in said system, whereby to show or gauge prevailing static pressure conditions in said system, and operable means adapted for actuation in response to movements of said sensitive portion, of clutch means selectively operable to drivingly connect said sensitive portion with said operable means and to disconnect the same therefrom, and brake means operable in unison with said clutch means to yieldingly brake said gauge portion against reaction to pressure fluctuations in said system while the sensitive portion is drivingly connected with the operable means.

12. In a measuring apparatus, the combination with means forming a fluid pressure system having a sensitive portion movable substantially in accordance with pressure fluctuations in the system, a gauge portion adapted to react substantially to static pressure conditions in said system, whereby to show or gauge prevailing static pressure conditions in said system, scribers respectively adapted for actuation in response to movements of said sensitive and gauge portions, and card holding means to support a record card in position to be marked by said scribers, of clutch means selectively operable to drivingly connect said sensitive portion with said scribers and to disconnect the same therefrom, and brake means operable in unison with said clutch means to yieldingly brake said gauge portion against reaction to pressure fluctuations in said system while the sensitive portion is drivingly connected with the operable means, and means for adjusting said card holding means with respect to said scribers to set the card in a selected datum position with respect to said scribers.

13. In a measuring apparatus, the combination with means forming a fluid pressure system having a portion movable substantially in accordance with static pressure fluctuations in the system, a scriber adapted for actuation in response to movements of said portion, and card holding means to support a record card for turning movement on a turning axis in position to be marked by the scriber, of means to adjust the apparatus to static pressure conditions in the system, comprising manually operable means for adjustably shifting the turning axis of said card to determine its datum position with respect to the scriber.

14. Measuring apparatus as set forth in claim 10, wherein the scriber is mounted for actuating movement in a path radially of the turning axis of the card, and the adjustable movement of said turning axis is in the general direction of scriber movement.

15. In a measuring apparatus, the combination with means forming a fluid pressure system having a portion movable substantially in accordance with pressure conditions in the system, a scriber adapted for actuation in an arcuate path in response to movements of said portion, of card holding means for supporting a record card for turning movement on a turning axis in position to be marked by the scriber, and manually operable means for shifting the turning axis of said card in the general direction of scriber movement to determine the datum position of the card with respect to the scriber.

WILLIAM J. CAMERON.

REFERENCES CITED

The following references are of record in the file of this patent:

UNITED STATES PATENTS

| Number | Name | Date |
|---|---|---|
| 689,529 | Wolfe | Dec. 24, 1901 |
| 2,121,014 | Cameron | June 21, 1938 |
| 2,186,517 | Bradford | Jan. 9, 1940 |
| 2,212,085 | Tate | Aug. 20, 1940 |
| 2,257,998 | Beal | Oct. 7, 1941 |
| 2,265,045 | Pfeiffer | Dec. 2, 1941 |
| 2,277,681 | Burdick et al. | Mar. 31, 1942 |
| 2,317,701 | Ullman | Apr. 27, 1943 |
| 2,425,899 | Sheiffele | Aug. 19, 1947 |